US012626845B2

(12) United States Patent
Hagiwara

(10) Patent No.: US 12,626,845 B2
(45) Date of Patent: May 12, 2026

(54) WOUND MAGNETIC CORE, ALLOY CORE, AND METHOD FOR MANUFACTURING WOUND MAGNETIC CORE

(71) Applicant: PROTERIAL, LTD., Tokyo (JP)

(72) Inventor: Kazuhiro Hagiwara, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 346 days.

(21) Appl. No.: 18/216,722

(22) Filed: Jun. 30, 2023

(65) Prior Publication Data

US 2024/0153686 A1 May 9, 2024

Related U.S. Application Data

(62) Division of application No. 17/426,568, filed as application No. PCT/JP2020/004275 on Feb. 5, 2020, now Pat. No. 11,749,430.

(30) Foreign Application Priority Data

Feb. 5, 2019 (JP) ................................ 2019-018687

(51) Int. Cl.

| | |
|---|---|
| ***H01F 1/153*** | (2006.01) |
| ***C22C 38/02*** | (2006.01) |
| ***C22C 38/16*** | (2006.01) |
| ***C22C 38/42*** | (2006.01) |
| ***H01F 27/25*** | (2006.01) |
| ***H01F 41/02*** | (2006.01) |

(52) U.S. Cl.

CPC ..... *H01F 1/15333* (2013.01); *H01F 1/15308* (2013.01); *H01F 1/15341* (2013.01); *H01F 27/25* (2013.01); *H01F 41/0226* (2013.01); *C22C 38/02* (2013.01); *C22C 38/16* (2013.01); *C22C 38/42* (2013.01)

(58) Field of Classification Search

CPC ..... H01F 1/12; H01F 1/14; H01F 1/15; H01F 1/16; H01F 1/18; H01F 1/20; H01F 1/22; H01F 1/24; H01F 1/26; H01F 1/28; H01F 1/33; H01F 1/34; H01F 1/342; H01F 1/344; H01F 1/346; H01F 1/348; H01F 1/36; H01F 1/37; H01F 1/375; H01F 1/38; H01F 3/04; H01F 27/25; H01F 27/2847; H01F 41/0213; H01F 41/022; H01F 41/0226; C22C 38/00

See application file for complete search history.

(56) References Cited

U.S. PATENT DOCUMENTS

| | | | |
|---|---|---|---|
| 2016/0369364 | A1 | 12/2016 | Brunner |
| 2020/0075236 | A1 | 3/2020 | Satake et al. |

FOREIGN PATENT DOCUMENTS

| | | |
|---|---|---|
| CN | 202307507 U | 7/2012 |
| CN | 106170837 | 11/2016 |
| EP | 3157021 | 4/2017 |
| EP | 3522186 | 8/2019 |

(Continued)

OTHER PUBLICATIONS

International Search Report for PCT/JP2020/004275, mailed Apr. 14, 2020.

(Continued)

*Primary Examiner* — Vanessa T. Luk

(74) *Attorney, Agent, or Firm* — NIXON PEABODY LLP; Jeffrey L. Costellia

(57) ABSTRACT

Provided herein is a method for manufacturing a wound magnetic core of a nanocrystalline soft magnetic alloy ribbon.

4 Claims, 6 Drawing Sheets

(56) References Cited

FOREIGN PATENT DOCUMENTS

| | | |
|---|---|---|
| JP | H-01-247557 | 10/1989 |
| JP | H-04-4393 | 1/1992 |
| JP | H-07-278764 | 10/1995 |
| JP | 2-501860 | 5/1996 |
| JP | H-09-17623 | 1/1997 |
| JP | 2016-163018 | 9/2016 |
| JP | 2016-197646 | 11/2016 |
| JP | 2017-152424 | 8/2017 |
| WO | WO-2007/119412 | 10/2007 |
| WO | WO-2015/190528 | 4/2017 |
| WO | WO-2018/062310 | 4/2018 |
| WO | WO-2018/155514 | 8/2018 |
| WO | WO-2018/235800 | 12/2018 |

OTHER PUBLICATIONS

Notice of Reasons for Refusal (Japanese Application No. 2020-571228) mailed Apr. 26, 2022 (8 pages).
Chinese Office Action for Application No. 202080011077.2, mailed Oct. 13, 2022 (16 pages).
Chinese Office Action in Chinese Application No. 202310136005.6 dated Mar. 5, 2026 (6 pages).

WOUND MAGNETIC CORE, ALLOY CORE, AND METHOD FOR MANUFACTURING WOUND MAGNETIC CORE

TECHNICAL FIELD

The present disclosure relates to a non-circular wound magnetic core obtained by winding a soft magnetic alloy ribbon made of a nanocrystalline alloy, an alloy core, and a method for manufacturing a wound magnetic core.

BACKGROUND ART

An increase in the frequency of inverters following an increase in the performance of power semiconductor devices makes it possible to improve the current-voltage control capacity, but high frequency leakage current caused by common mode voltage generated by inverters has become a problem. As a means for suppressing this, common mode choke coils have been used. Common mode choke coils have a magnetic core made of a soft magnetic material. Patent Document No. 1 discloses that a magnetic core made from a ribbon of an Fe-based or Co-based nanocrystalline alloy is suitable as a magnetic core for use in these. A nanocrystalline alloy exhibits a higher saturation magnetic flux density than a permalloy or a Co-based amorphous alloy, and has a higher magnetic permeability than an Fe-based amorphous alloy.

For example, Patent Document No. 2 discloses typical compositions of nanocrystalline alloys. A typical example of a method for manufacturing a magnetic core using a nanocrystalline alloy includes a step of producing an amorphous alloy ribbon by quenching a molten metal of a material alloy having an intended composition, a step of winding the amorphous alloy ribbon into a ring-shaped wound magnetic core, and a step of crystallizing the amorphous alloy ribbon by heat treatment to obtain a magnetic core having a nanocrystalline structure.

With magnetic cores made of nanocrystalline alloys, it is possible to significantly change the magnetic properties such as the magnetic permeability p and the squareness ratio by the temperature profile during the heat treatment or by applying a magnetic field in a particular direction during the heat treatment. For example, Patent Document No. 3 describes a magnetic core having a high magnetic permeability and a low squareness ratio, wherein the magnetic permeability p (50 Hz-1 kHz) is 70,000 or more and the squareness ratio is 30% or less, realized by controlling the direction of magnetic field application to be the height direction or the radial direction of the magnetic core.

Typically, magnetic cores made of nanocrystalline alloys are often circular in shape. A circular magnetic core is manufactured by circularly winding an amorphous alloy ribbon into a ring-shaped wound magnetic core, and then performing a heat treatment that involves nanocrystallization (hereinafter, nanocrystallization heat treatment).

On the other hand, depending on the space in which the magnetic core is used, there may be a demand for a non-circular magnetic core such as a rectangular or elliptical magnetic core. When manufacturing a non-circular magnetic core, the nanocrystallization heat treatment is performed after the inner circumference of a wound magnetic core is straightened to a non-circular shape by a non-circular inner shape correction jig.

Patent Document No. 4 discloses a nanocrystallization heat treatment method, including winding an amorphous alloy ribbon around a core, then relieving the stress in the ribbon through a primary heat treatment of holding the ribbon at a temperature below the crystallization start temperature, removing the core, and then performing a secondary heat treatment for nanocrystallization of the ribbon at a temperature equal to or higher than the crystallization start temperature. According to Patent Document No. 4, this method can suppress the deterioration of magnetic properties due to the stress generated during heat treatment.

CITATION LIST

Patent Literature

Patent Document No. 1: Japanese Patent No. 2501860
Patent Document No. 2: Japanese Patent Publication for Opposition No. 4-4393
Patent Document No. 3: Japanese Laid-Open Patent Publication No. 7-278764
Patent Document No. 4: Japanese Laid-Open Patent Publication No. 1-247557

SUMMARY OF INVENTION

Technical Problem

In the application of electric vehicles, etc., a wound magnetic core such as a common mode choke coil is in some cases installed inside a device where many wires and electronic parts are placed. In such a case, the installed wound magnetic core may be designed in a shape that does not spatially interfere with these parts. Specifically, there may be a demand for a non-circular wound magnetic core. In recent years, such non-circular wound magnetic cores have been demanded increasingly.

The present disclosure provides a wound magnetic core made of a nanocrystalline soft magnetic alloy ribbon that has a non-circular shape and yet achieves impedance characteristics equivalent to those achieved with a circular shape, an alloy core and a method for manufacturing a wound magnetic core.

Solution to Problem

A method for manufacturing a wound magnetic core of a nanocrystalline soft magnetic alloy ribbon according to one embodiment of the present disclosure includes: a first heat treatment step of subjecting a wound magnetic core, which is formed by winding an amorphous soft magnetic alloy ribbon capable of nanocrystallization, to a heat treatment at a temperature that is 300° C. or higher and below a crystallization start temperature, with a first inner shape correction jig for holding the wound magnetic core in a non-circular shape placed in an internal space of the wound magnetic core; and a second heat treatment step of subjecting the wound magnetic core to a heat treatment for nanocrystallization at a temperature equal to or higher than the crystallization start temperature, with the first inner shape correction jig removed and with at least one second inner shape correction jig placed in the internal space of the wound magnetic core, wherein: a cross section of the second inner shape correction jig perpendicular to a direction in which the second inner shape correction jig extends is smaller than a cross section of the first inner shape correction jig Perpendicular to a direction in which the first inner shape correction jig extends; and a magnetic field is applied to the wound magnetic core over a partial period of the second heat treatment step.

In the second heat treatment step, the magnetic field may be applied while a temperature is decreasing after the heat treatment for nanocrystallization.

In the first heat treatment step, an outer shape correction jig for holding the wound magnetic core in a non-circular shape may be placed on an outer side of the wound magnetic core.

In the second heat treatment step, one of the at least one second inner shape correction jig may be placed in the internal space of the wound magnetic core.

Before the heat treatment for nanocrystallization, the one second inner shape correction jig may be located in the internal space of the wound magnetic core so as not to be in contact with the wound magnetic core.

An, outer circumferential shape of the cross section of the one second inner shape correction jig may be similar to an outer circumferential shape of the cross section of the first inner shape correction jig.

The outer circumferential shape of the one second inner shape correction jig may have an area that is 0.5 times or more and 0.9 times or less the outer circumferential shape of the first inner shape correction jig.

In the second heat treatment step, a plurality of the at least one second inner shape correction jig may be placed in the internal space of the wound magnetic core.

The plurality of second inner shape correction jigs may be movable in the internal space of the wound magnetic core.

Before the heat treatment for nanocrystallization, the plurality of second inner shape correction jigs may be located in the internal space of the wound magnetic core so as not to be in contact with the wound magnetic core.

The plurality of second inner shape correction jigs may be inscribed with a shape that is similar to the outer circumferential shape of the cross section of the first inner shape correction jig in a cross section perpendicular to an axis of the wound magnetic core; and the similar shape may have an area that is 0.5 times or more and 0.9 times or less the outer circumferential shape of the first inner shape correction jig.

The method may further include an impregnation step of impregnating the wound magnetic core with a resin after the second heat treatment step.

A wound magnetic core of a nanocrystalline soft magnetic alloy ribbon according to one embodiment of the present disclosure is a wound magnetic core of a nanocrystalline soft magnetic alloy ribbon, wherein the wound magnetic core has a non-circular shape, and an impedance relative magnetic permeability μrz at 100 kHz of the wound magnetic core is 45000 or more.

The wound magnetic core may have a racetrack shape or has a racetrack shape with a concave/convex portion along at least one straight portion of the racetrack shape.

In a state where an AC magnetic field of frequency f=10 kHz and amplitude H=0.05 A/m is applied, the wound magnetic core may have a relative magnetic permeability p (10 kHz) of 80,000 or more, as measured at room temperature, a direct-current BH loop squareness ratio Br/Bm of 50% or more and a coercive force of 1.1 A/m or less.

The wound magnetic core may have no portion where the nanocrystalline soft magnetic alloy ribbon is spaced apart by 0.1 t or more from a nanocrystalline soft magnetic alloy ribbon that is adjacent thereto in a stacking direction, wherein t is a thickness of the wound magnetic core in the stacking direction.

An alloy core according to one embodiment of the present disclosure includes: a wound magnetic core of a nanocrystalline soft magnetic alloy ribbon as set forth above; and a resin with which the wound magnetic core is impregnated.

Advantageous Effects of Invention

The present disclosure provides a wound magnetic core made of a nanocrystalline soft magnetic alloy ribbon that has a non-circular shape and yet achieves impedance characteristics equivalent to those achieved with a circular shape, an alloy core and a method for manufacturing a wound magnetic core.

DESCRIPTION OF EMBODIMENTS

Figure 1:
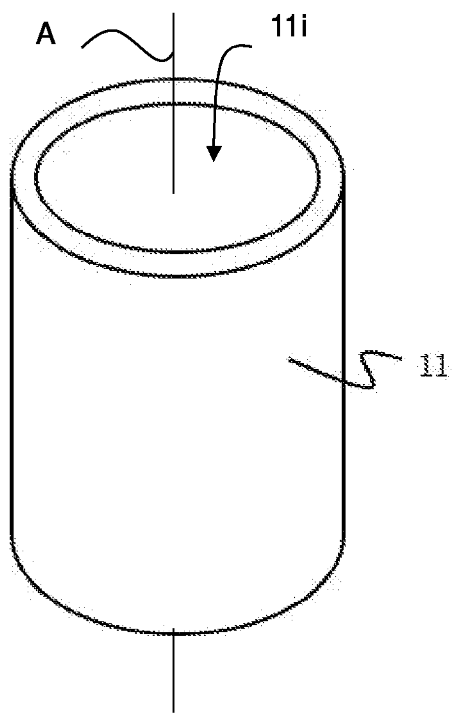
FIG. 1 is a view showing a state where an amorphous ribbon has been wound.

The present inventor has made an in-depth study on a method for manufacturing a non-circular wound magnetic core made of a nanocrystalline soft magnetic alloy ribbon. The circular shape and the non-circular shape of a wound magnetic core as used in the present application refer to the outer shape of the wound magnetic core in a cross section parallel to the stacking direction of the ribbon of the wound magnetic core. The stacking direction of the ribbon is the direction perpendicular to the primary surface of the ribbon. A cross section of a wound magnetic core that is parallel to the stacking direction of the ribbon is also a cross section that is perpendicular to the axis of the wound magnetic core. Each wound magnetic core has an internal space, and the cross section has a non-circular ring shape. That is, the non-circular wound magnetic core of the present disclosure has a non-circular ring-shaped cross section, and the outer and inner circumferences have non-circular shapes that are generally similar to each other.

In general, the amorphous alloy ribbon shrinks over the course of nanocrystallization, and the volume of the ribbon decreases by about 1%. In the case of a circular wound magnetic core made of a nanocrystalline soft magnetic alloy ribbon, since the cross section of the wound magnetic core parallel to the stacking direction has a circular shape, the stress from the shrinkage of the ribbon acts uniformly to shrink the circle, and therefore the ribbon is unlikely to shrink. In contrast, in the case of a non-circular wound magnetic core, the stress from the shrinkage of the ribbon acts non-uniformly, which may result in deformation. Therefore, in order to prevent deformation, one may consider performing a nanocrystallization heat treatment with an inner shape correction jig (inner mold jig) placed on the inner circumference of the wound magnetic core. In this case, however, the shrinkage of the ribbon is suppressed. Therefore, as the nanocrystallization of the ribbon progresses, an internal magnetic field is generated in the ribbon due to the suppression of shrinkage. This may give unexpected induced magnetic anisotropy and cause property degradation.

Patent Document No. 4 states that the two-step heat treatment described above can suppress influence of property degradation caused by the core, and particularly has a significant effect also when producing a rectangular magnetic core, or the like.

On the other hand, when manufacturing a common mode choke coil, an in-field heat treatment of applying a magnetic field in a particular direction may be performed during the heat treatment in order to adjust the electric and magnetic properties. The application of a magnetic field is done at a temperature that is before or after the occurrence of nanocrystallization during the heat treatment or while the temperature is decreasing after nanocrystallization. Thus, it is possible to increase the impedance of the wound magnetic core at a frequency of 100 kHz, for example.

However, it has been found that when a magnetic field is applied during the secondary heat treatment according to the method of Patent Document No. 4, there may be a problem that a repulsive force is caused by magnetization between layers of the wound ribbon, thereby significantly deforming the wound magnetic core, due to the absence of the inner shape correction jig. In view of such a problem, the present disclosure provides a manufacturing method and a product for a wound magnetic core made of a nanocrystalline soft magnetic alloy ribbon that has a non-circular shape and yet achieves impedance characteristics equivalent to those achieved with a circular shape.

An embodiment of the present disclosure will now be described, but the present disclosure is not limited to the following embodiment. As used herein, each numerical range expressed with "–" means a range that is inclusive of numerical values shown before and after "–" as the minimum value and the maximum value, respectively.

An embodiment of the present disclosure is a method for manufacturing a wound magnetic core of a nanocrystalline soft magnetic alloy ribbon, the method, including:

- a first heat treatment step of subjecting a wound magnetic core, which is formed by winding an amorphous soft magnetic alloy ribbon capable of nanocrystallization, to a heat treatment at a temperature that is 300° C. or higher and below a crystallization start temperature, with a first inner shape correction jig for holding the wound magnetic core in a non-circular shape placed in an internal space of the wound magnetic core; and
- a second heat treatment step of subjecting the wound magnetic core to a heat treatment for nanocrystallization at a temperature equal to or higher than the crystallization start temperature, with the first inner shape correction jig removed and with at least one second inner shape correction jig placed in the internal space of the wound magnetic core, wherein:
- a cross section of the second inner shape correction jig perpendicular to a direction in which the second inner shape, correction jig extends is smaller than a cross section of the first inner shape correction jig perpendicular to a direction in which the first inner shape correction jig extends; and
- a magnetic field is applied to the wound magnetic core over a partial period of the second heat treatment step.

In the manufacture of a non-circular wound magnetic core using a nanocrystalline alloy ribbon, if a heat treatment that involves nanocrystallization is performed while a shape correction jig for maintaining the shape in a non-circular shape is left in place, unintended stress is applied between ribbons due to a decrease in volume of the soft magnetic alloy ribbon during nanocrystal formation, thereby deteriorating the magnetic properties.

In order to reduce such deterioration of the magnetic properties, it is effective to obtain a wound magnetic core of a nanocrystalline soft magnetic alloy ribbon by the manufacturing method described above including the first heat treatment step and the second heat treatment step.

<Amorphous Soft Magnetic Alloy Ribbon Capable of being Nanocrystallized>

A method for manufacturing a wound magnetic core according to the present embodiment uses an amorphous soft magnetic alloy ribbon that can be nanocrystallized. This soft magnetic alloy ribbon is basically obtained by quenching a molten alloy to obtain an amorphous alloy ribbon having a predetermined composition. By subjecting this amorphous alloy ribbon to a heat treatment for nanocrystallization at a temperature equal to or higher than the crystallization start temperature, it is possible to obtain a nanocrystalline soft magnetic alloy ribbon.

As a result of an analysis based on X-ray diffraction and transmission electron microscopy, it has been found that fine crystal grains are Fe of a body-centered cubic lattice structure, with Si, or the like, present in solid solution. At least 30% by volume of the Fe-based nanocrystalline alloy is occupied by fine crystal grains with an average grain size of 100 nm or less as measured in largest dimension. The portion of the Fe-based nanocrystalline alloy other than the fine crystal grains is mainly amorphous. The percentage of the fine crystal grains may be 80% by volume or more, or may be substantially 100% by volume.

The composition of the Fe-based nanocrystalline alloy used in the embodiment of the present disclosure is preferably an Fe-based composition represented by the following general formula.

$$(Fe_{1-a}M_a)_{100-x-y-z-\alpha-\beta-\gamma}Cu_xSi_yB_zM'_\alpha M''_\beta X_\gamma \text{(atom \%)} \quad \text{General formula:}$$

where M is at least one element selected from Co and Ni, M' is at least one element selected from Nb, Mo, Ta, Ti, Zr, Hf, V, Cr, Mn and W, M" is at least one element selected from Al, platinum group elements, Sc, rare earth elements, Zn, Sn and Re, and X is at least one element selected from C, Ge, P, Ga, Sb, In, Be and As.

a, x, y, z, α, β and γ, which define the composition ratio, can satisfy the following relationships.

$$0 \le a < 0.5$$

$$0.1 \le x \le 3$$

$$10 \le y \le 20$$

$$5 \le z \le 10$$

$$0.1 \le \alpha \le 5$$

$0 \leq \beta \leq 10$ $0 \leq \gamma \leq 10$

The preferred compositions will now be described in detail.

The Fe-based nanocrystalline alloy contains 0.1-3 atom % of Cu. If Cu is less than 0.1 atom %, there will be substantially no effect, from the addition of Cu, of reducing core loss and realizing a predetermined p'. On the other hand, if Cu is greater than 3 atom %, core loss may be rather greater than that of an alloy without addition of Cu. In addition, p' decreases and it is not possible to realize a predetermined μ'. In the present disclosure, a particularly preferred Cu content x ix 0.5-2 atom %. In this range, the core loss is particularly small.

The addition of Cu has an effect of crystal grain refinement. The reason for this is unknown, but it may be as follows. The interaction parameter between Cu and Fe is positive, and the solid solubility is low, and they tend to separate from each other. Therefore, when an alloy in an amorphous state is heated, the Fe atoms or the Cu atoms gather to form clusters, resulting in compositional fluctuations. Therefore, a large number of regions are produced that are likely to be partially crystallized, and fine crystal grains are produced with these regions serving as the nuclei. The primary component of these crystals is Fe, and there is substantially no solid solution of Cu. Thus, through crystallization, Cu is expelled around the fine crystal grains, and the Cu concentration increases around the crystal grains. Therefore, it is believed that crystal grains are difficult to grow.

The effect of crystal grain refinement by the addition of Cu is believed to be particularly significant in the presence of at least one element selected from Nb, Mo, Ta, Ti, Zr, Hf, V, Cr Mn and W. The effect of these elements to promote refinement is particularly large for Nb, Mo, Ta, Zr and Hf. When Nb is added, among these elements, the crystal grains are likely to be particularly fine, and it is possible to obtain an alloy also having excellent soft magnetic properties. When Nb is added, a fine crystalline phase is generated whose primary component is Fe. Thus, the magnetostriction is smaller as compared with the Fe-based amorphous alloy, and it is possible to reduce the unexpected magnetic anisotropy caused by the stress applied to the Fe-based nanocrystalline alloy at the time of handling. These phenomena are also considered to be one reason for the improvement of the soft magnetic properties. These elements are contained in the range of 0.1-5 atom %. Preferably, the range is 2-5 atom %. Below 0.1 atom %, the grain refinement may possibly be insufficient. Over 5 atom %, the decrease in saturation magnetic flux density becomes significant.

Si and B are elements that are particularly useful for crystal grain refinement of an Fe-based nanocrystalline alloy. An Fe-based nanocrystalline alloy is obtained by obtaining an amorphous alloy by the effect of addition of Si and B, for example, and then forming fine crystal grains through heat treatment. Si is contained in the range of 10-20 atom %. If the Si content is less than 10 atom %, the amorphous formation ability of the alloy is low, and it is difficult to stably obtain an amorphous material. Moreover, since the crystal magnetic anisotropy of the alloy is not sufficiently reduced, it is difficult to obtain excellent soft magnetic properties (e.g., a low coercive force). If the Si content is over 20 atom %, the saturation magnetic flux density of the alloy is significantly reduced, and the obtained alloy easily becomes brittle. A preferred Si lower limit value is 14 atom %. On the other hand, a preferred Si upper limit value is 18 atom %.

Note that B is contained in the range of 5-10 atom %. B is an element that is essential for amorphous formation, and if the B content is less than 5 atom %, the amorphous formation ability is low and it is difficult to stably obtain an amorphous material. If the B content is over 10 atom %, the saturation magnetic flux density is significantly reduced. A preferred lower limit value of B is 6 atom %. On the other hand, a preferred upper limit value of B is 8.5 atom %.

The Fe-based nanocrystalline alloy may contain 10 atom % or less or 0 atom % of at least one, element selected from C, Ge, P, Ga, Sb, In, Be and As. These elements are effective for amorphization in the formation of an amorphous alloy ribbon. Adding these elements, together with Si and B, helps to amorphize the alloy and also realizes the effect of adjusting the magnetostriction and the Curie temperature.

At least one element selected from Al, platinum group elements, Sc, rare earth elements, Zn, Sn and Re may be contained by 10 atom % or less or 0 atom %. These elements have the effect of corrosion resistance improvement, magnetic property improvement and magnetostriction adjustment. The content being over 10 atom % causes a significant reduction of the saturation magnetic flux density. A particularly preferred content of these elements is 8 atom % or less. Among these elements, when at least one element selected from the group consisting of Ru, Rh, Pd, Os, Ir and Pt is added, a nanocrystalline soft magnetic alloy having a particularly good corrosion resistance is obtained.

The remainder is substantially Fe except for impurities. Part of Fe may also be replaced by Co or Ni. The content a of M (Co and/or Ni) in the general formula above is $0 \leq a < 0.5$. If a is over 0.3, the core loss may increase, and it is therefore preferably $0 \leq a \leq 0.3$. Here, a=0 is preferred to obtain high μ'.

A soft magnetic alloy ribbon made of the nanocrystalline alloy of the embodiment of the present disclosure may have, a thickness of 10 μm-25 μm, for example. This soft magnetic alloy ribbon is normally produced continuously by roll-cooling a molten alloy. Having been produced by roll cooling, it is in the state of an amorphous alloy ribbon. The amorphous alloy ribbon produced by roll cooling is long because of the manufacturing process. Therefore, it is usually transported in a wound state. Thereafter, it is slit to a predetermined width as needed.

<First Heat Treatment Step>

Figure 2:
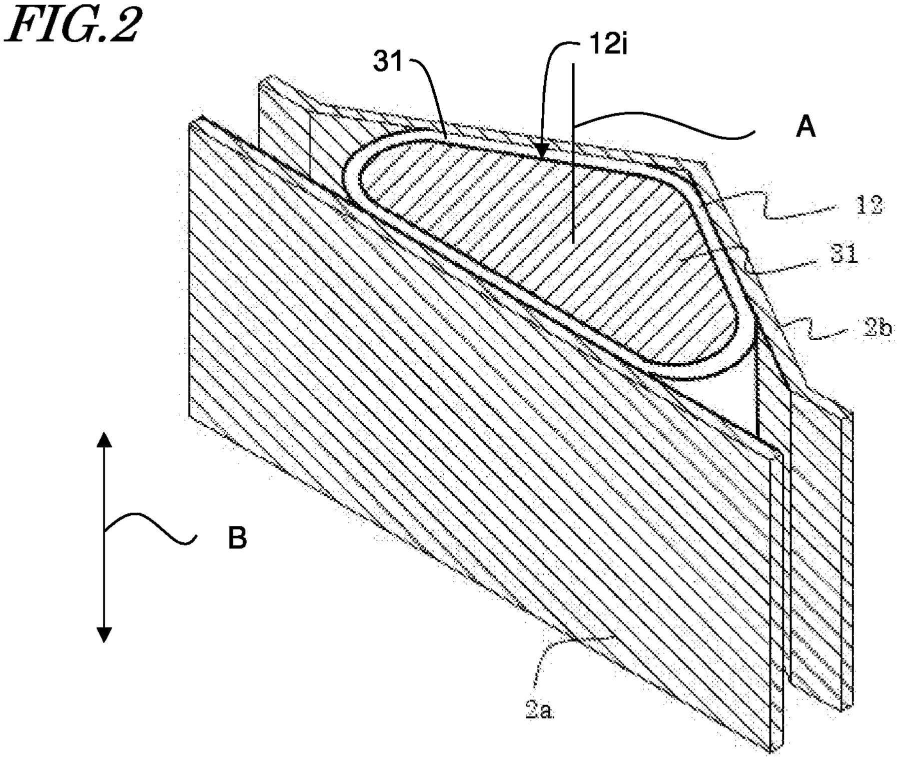
FIG. 2 is a view showing a wound magnetic core that is shaped by an outer shape correction jig and a first inner shape correction jig.

In the first heat treatment step, first, a winding step of forming a wound magnetic core 11 having the axis A by winding an amorphous alloy ribbon that has been slit to a predetermined width into a circular shape as shown in FIG. 1 is performed. Thereafter, the wound magnetic core 11 is deformed into an intended shape, and a first inner shape correction jig 31 is placed in an inner space 11*i* of the wound magnetic core 11, thereby forming, and maintaining the shape of, a non-circular wound magnetic core 12, as shown in FIG. 2. In this process, outer shape correction jigs (outer mold jigs) 2*a* and 2*b* may be placed as shown in FIG. 2. In this state, the wound magnetic core 12 has a non-circular shape due to elastic deformation, and the wound magnetic core 12 is urged back, into a circular shape if the first inner shape correction jig 31 and the outer shape correction jigs 2*a* and 2*b* are removed. The first inner shape correction jig 31, when inserted into the wound magnetic core 11, preferably has a non-circular shape that is similar to the intended non-circular shape of the wound magnetic core to be produced in a cross section perpendicular to the direction B in which the first inner shape correction jig 31 extends. Here, the direction B in which the first inner shape correction jig 31 extends refers to the direction parallel to the axis A of the wound magnetic core 12 when the first inner shape correction jig 31 is inserted into the wound magnetic core 11. The direction in which second inner shape correction jigs 32*a*, 32*b* and 32*c* to be described below extend is defined similarly.

While an amorphous alloy ribbon is wound into a circular shape and is then held in a non-circular shape by using the first inner shape correction jig 31 in the present embodiment, an amorphous alloy ribbon may be wound directly around the first inner shape correction jig 31 of a non-circular shape to form the non-circular wound magnetic core 12. While a generally triangular shape is shown as an example non-circular shape of the outer circumference of the cross section in the present embodiment, the wound magnetic core of the present disclosure is not limited to this shape, but the wound magnetic core may have any other shape such as a generally rectangular or elliptical shape. That is, the wound magnetic core 11 may have any non-circular shape that can be held by using the first inner shape correction jig or the first inner shape correction jig and the outer shape correction jig. When viewed in a cross-sectional shape, the wound magnetic core may have a racetrack shape having two semicircles connected together by two straight portions, or may have a shape in which one or both of the two straight portions of the racetrack shape has a portion that is concave or convex toward the outside.

Thereafter, while the first inner shape correction jig 31 for holding the wound magnetic core 12 in a non-circular shape is placed in an internal space (hole) 12*i* of the wound magnetic core 12, the wound magnetic core 12 is heat-treated at a temperature that is 300° C. or higher and below the crystallization start temperature. Through this first heat treatment step, the shape of the wound magnetic core 12 of the amorphous alloy ribbon is fixed in the non-circular shape. Thus, the shape is held even in the absence of the inner shape correction jig 31.

In, the first heat treatment step, by being heated in a non-reactive atmosphere gas, the stress caused by being deformed into a non-circular shape is easily relieved. In the first heat treatment step, a nitrogen gas can be treated substantially as a non-reactive, atmosphere gas. An inert gas may also be used as a non-reactive atmosphere gas. A reducing gas such as a hydrogen gas may also be used. The heat treatment may also be performed in a vacuum.

The temperature of the heat treatment in the first heat treatment step (hereinafter referred to as the first heat treatment temperature) is selected in the range of 300° C. or higher and below the crystallization start temperature. If performed below 300° C., it is not possible to fix the shape to a non-circular shape. At or above the crystallization start temperature, a nanocrystal phase is formed and the volume of the amorphous alloy ribbon decreases, thereby generating unexpected stress against the correction jig and deteriorating the magnetic properties.

Note that in the present application, the crystallization start temperature is defined as the temperature at which an exothermic reaction due to the start of nanocrystallization is detected when measured by a differential scanning calorimetry (DSC) whose measurement condition is set to a temperature increase rate of 10° C./min.

Figure 7:
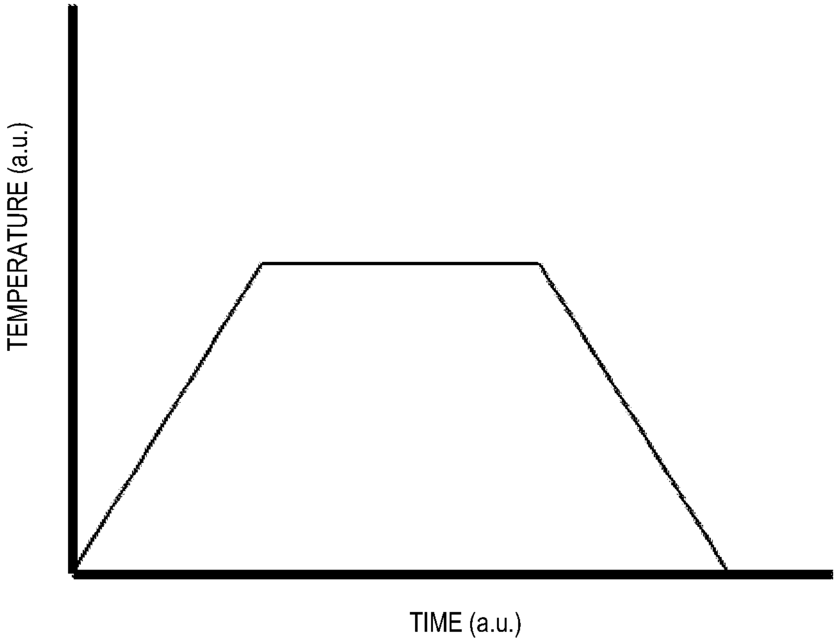
FIG. 7 is a graph illustrating a heat treatment condition of a first heat treatment step.

Since the soft magnetic alloy ribbon made of the F based nanocrystalline alloy described above has a crystallization start temperature in the range of generally 510-550° C., the first heat treatment temperature is preferably performed below 510° C. FIG. 7 shows a schematic of the temperature profile of the heat treatment in the first heat treatment step. The upper limit of the first heat treatment temperature is preferably 500° C., and more preferably 480° C. If the first heat treatment temperature is too low, the stress relief progresses slowly and the heat treatment takes time, which is undesirable from a productivity point of view. The lower limit of the first heat treatment temperature is 300° C., and preferably 350° C.

The amount of time over which the temperature, is held in the range of the first heat treatment temperature needs to be sufficient for the stress relief, and the lower limit value thereof is preferably 10 minutes, and more preferably 30 minutes. While there is no particular limitation on the upper limit value, an excessively long time is not desirable in terms of productivity. Therefore, the upper limit of the amount of time for which the temperature is held is preferably 180 minutes, and more preferably 90 minutes.

<Second Heat Treatment Step>

Figure 4:
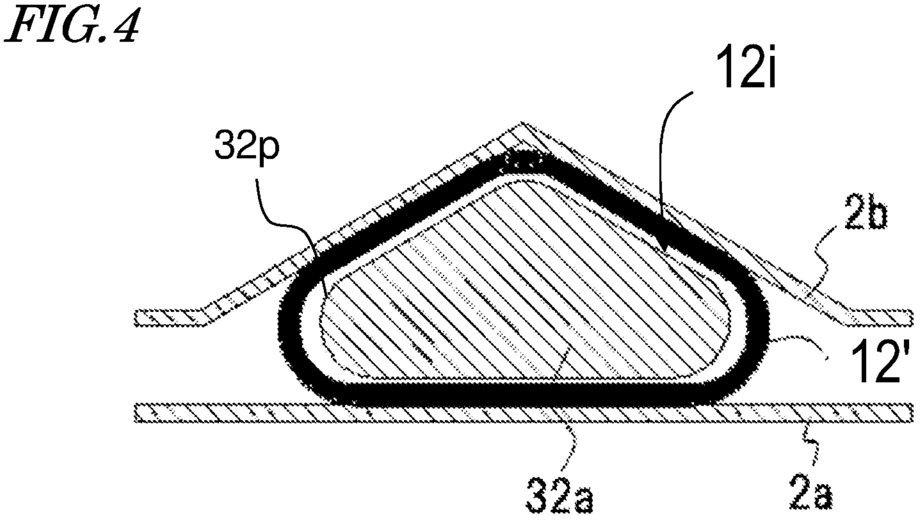
FIG. 4 is a view illustrating the shape of a second inner shape correction j g.

After the first heat treatment step, the first inner shape correction jig 31 is removed, and the second inner shape correction jig 32*a*, which is smaller than the first inner shape correction jig 31, is placed in the internal space 12*i* of a wound magnetic core 12', as shown in FIG. 4, and in this state, the second heat treatment step is performed, in which the wound magnetic core 12' is heat-treated for nanocrystallization at a temperature that is equal to or higher than the crystallization start temperature. At this time, the outer shape correction jig may be placed on the outer circumference of the wound magnetic core 12. By the first heat treatment step, the wound magnetic core 12' maintains the intended non-circular shape even in the absence of the inner shape correction jig 31. In other words, the wound magnetic core 11 deforms plastically through the first heat treatment, thereby obtaining the wound magnetic core 12' having an intended non-circular shape.

Figure 3:
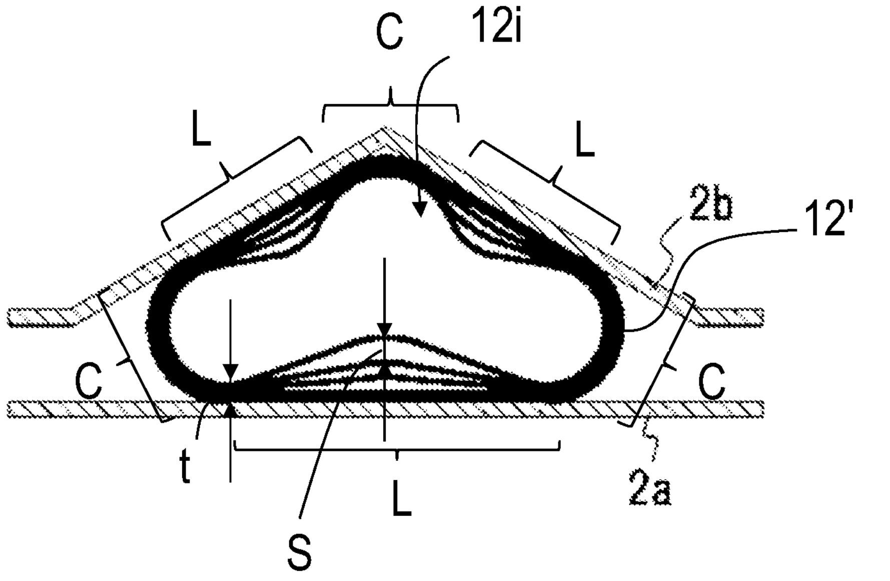
FIG. 3 is a view illustrating a state of a wound magnetic core where an in-field heat treatment is performed in the absence of a second inner shape correction jig.

When the second heat treatment step that involves nanocrystallization is performed, the ribbon of the wound magnetic core shrinks. Specifically, the amorphous alloy ribbon three-dimensionally shrinks in two orthogonal directions, i.e., the thickness direction and a direction perpendicular to the thickness direction, as a result of nanocrystallization. For example, in the longitudinal direction of the amorphous alloy ribbon, it diminishes by about 1% in length. Therefore, if the second heat treatment is performed while the inner shape, correction jig 31 used in the first heat treatment step is left in place, stress is applied to the wound magnetic core during nanocrystallization. In contrast, if the inner shape correction jig 31 is removed, it is possible to avoid the influence of the stress applied during nanocrystallization. However, when a magnetic field is applied to the wound magnetic core during the second heat treatment, deformation of the wound magnetic core occurs as shown in FIG. 3. Specifically, a ribbon separates from a ribbon that is adjacent thereto in the stacking direction on the inner circumference side, thereby creating a gap. For example, for a thickness t of the wound magnetic core 12' in the stacking direction, there are one or more portions where a ribbon is separated from a ribbon that is adjacent thereto in the stacking direction by the gap S of 0.1 t or more (ribbon fluctuation). This is due to magnetization of the amorphous ribbon by the applied magnetic field and a repulsive force caused by magnetization between amorphous ribbons. Particularly, this deformation is more pronounced in the straight portions L of the wound magnetic core, since the amorphous ribbon has a higher degree of freedom to deform in the straight portions L than in the corner portions C.

Therefore, in the present disclosure, the first inner shape correction jig is removed after the first heat treatment step, and at least one second inner shape correction jig, which is smaller than the first inner shape correction jig, is placed in the inner space of the wound magnetic core. This can reduce the deformation of the wound magnetic core during the in-field heat treatment by the second heat treatment step, and also reduce the influence of the stress due to a decrease in size of the wound magnetic core during nanocrystallization.

Because of the reason for deformation described above, the present invention is particularly effective for a wound magnetic core with a non-circular cross section, and particularly for a wound magnetic core that includes a large proportion of straight portions in the cross section. For example, the present invention is particularly effective for a wound magnet core having a non-circular cross section, in which the proportion of the total length of straight or curved portions (arcs or straight lines with a radius greater than 10 cm) having a curvature of 10 $m^{-1}$ or less in the inner circumferential shape of the cross section of the wound magnetic core is 10% or more of the total length of the inner circumference.

While the second inner shape correction jig has the effect of suppressing deformation of the inner diameter portion of the wound magnetic core, the deformation suppressing effect is less than that of the first inner shape correction jig. That is, the second inner shape correction jig allows more shrinking deformation of the wound magnetic core than the first inner shape correction jig. In the second heat treatment step, the wound magnetic core is deformed in the shrinking direction. In this case, if the first inner shape correction jig, which is more effective in suppressing the deformation, is used as it is, the deformation is suppressed, thereby imposing unnecessary stress on the wound magnetic core, and deteriorating the magnetic properties of the wound magnetic core. Therefore, in the present disclosure, the second inner shape correction jig, which has a deformation suppressing effect but is less effective than the first inner shape correction jig, is used on purpose. Thus, the amount of deformation of the wound magnetic core can be adjusted in two steps, and the deterioration of magnetic properties of the wound magnetic core is suppressed by varying the heat treatment temperature between the first and second heat treatment steps.

To achieve this effect, it is preferred that the second inner shape correction jig has a smaller external dimension than the first inner shape correction jig. Specifically, the cross section of the second inner shape correction jig perpendicular to the direction in which the second inner shape correction, jig extends is smaller than the cross section of the first inner shape correction jig perpendicular to the direction in which the first inner shape correction jig extends. For example, the dimension of the second inner shape correction jig is preferably 0.5%-20% smaller than the first inner shape correction jig 31. This percentage is not in terms of area, but in terms of length. More specifically, it is expressed as a percentage of the length of the outer circumference (outer edge) of the first inner shape correction jig 31 and the second inner shape correction jig 32*a* in the cross section perpendicular to the direction in which the jigs extend (the direction of the axis of the wound magnetic core when inserted in the wound magnetic cores 12 and 12'). This cross section is parallel to a plane that defines the shape of the wound magnetic cores 12 and 12' with the first inner shape correction jig 31 and the second inner shape correction jig 32*a* inserted in the wound magnetic cores 12 and 12'. Hereafter, the shape of the cross section of an inner shape correction jig refers to the cross section according to this definition.

If the lower limit value of the reduction percentage in length is less than 0.5%, unnecessary stress is applied to the wound magnetic core 12' in the second heat treatment step, and the magnetic properties of the produced wound magnetic core are likely to deteriorate. The lower limit value is preferably 0.8%, preferably 1.0%, and more preferably 1.5%. On the other hand, if the upper limit value is over 20%, it is difficult to obtain a wound magnetic core of an intended size. The upper limit value is preferably 15%, and more preferably 10%.

One or more second inner shape correction jigs can be placed in the internal space of the wound magnetic core. When one second inner shape correction jig is placed, the cross-sectional shapes of the first inner shape correction jig and the second inner shape correction jig may be similar to each other. When a plurality of second inner shape correction jigs are placed, the cross-sectional shapes of the second inner shape correction jigs may be different from the cross-sectional shape of the first inner shape correction jig. FIG. 4 shows the second inner shape correction jig 32*a* whose shape is similar to a first inner shape correction jig 32, and FIG. 5 and FIG. 6 each show an example where a plurality of second inner shape correction jigs 32*b* and 32*c* are placed.

As shown in FIG. 4, when one second inner shape correction jig 32*a* is placed, before the nanocrystallization heat treatment, the second inner shape correction jig 32*a* may be placed and fixed in the internal space 12*i* of the wound magnetic core 12' so as not to be in contact with the wound magnetic core.

Figure 5:
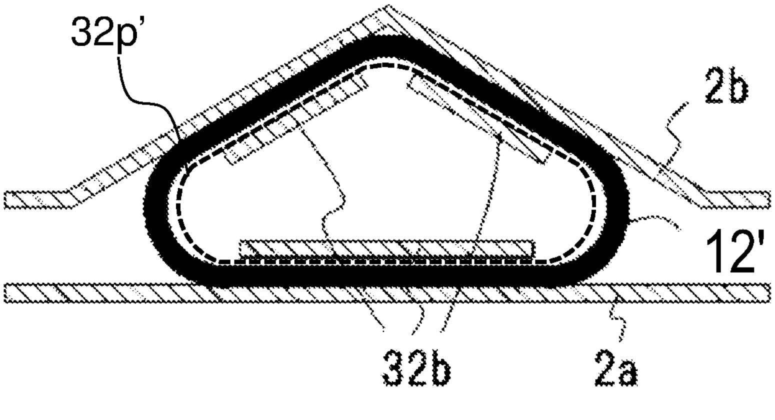
FIG. 5 is a view illustrating the shape of another second inner shape correction jig.
Figure 6:
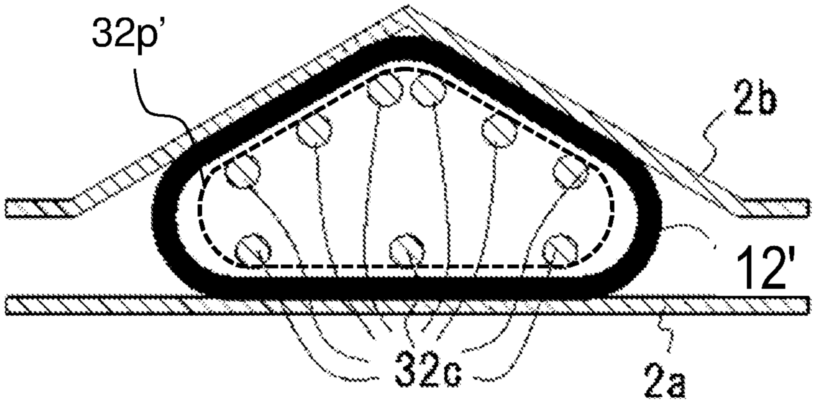
FIG. 6 is a view illustrating the shape of another second inner shape correction jig.

FIG. 5 and FIG. 6 each show an example where a plurality of second inner shape correction jigs 32*b* and 32*c* are placed. When a plurality of second inner shape correction jigs 32*b* and 32*c* are placed, before the nanocrystallization heat treatment, the second inner shape correction jigs 32*b* and 32*c* may be placed and fixed in the internal space 12*i* of the wound magnetic core 12' so as not to be in contact with the wound magnetic core 12'. Specifically, the second inner shape correction jigs 32*b* and 32*c* may be placed inscribed with a shape 32*p*' that is similar to the outer circumferential shape of the cross section of the first inner shape correction jig in a cross section perpendicular to the axis of the wound magnetic core. The plurality of second inner shape correction jigs 32*b* and 32*c* may have the same cross-sectional shape or may have partially different cross-sectional shapes. Any of the second inner shape correction jigs 32*a* to 32*c* are placed particularly in the straight portions of the cross-sectional shape of the wound magnetic core, thereby suppressing deformation during magnetic field application in these portions. Specifically, it is possible, to obtain a wound magnetic core in which no ribbon is spaced apart from a ribbon that is adjacent thereto in the stacking direction by the gap S of 0.1 t or more.

Figure 13:
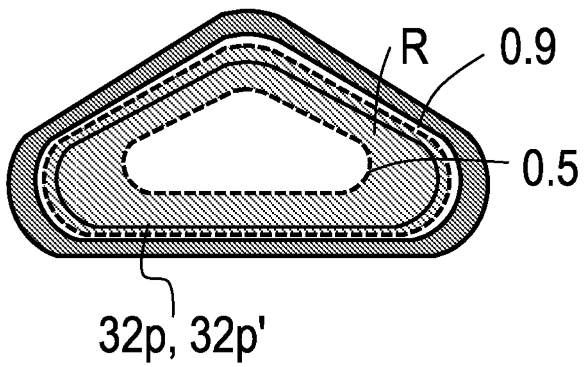
FIG. 13 is a schematic view illustrating the size of a second inner shape correction, jig.
Figure 14:
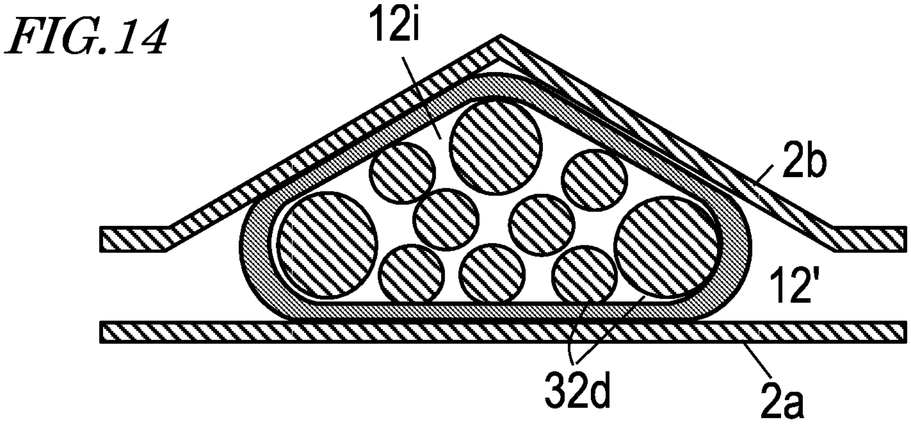
FIG. 14 is a view illustrating the shape and arrangement of another second inner shape correction jig.

In these cases, as shown in FIG. 13, an outer circumferential shape 32*p* of the cross section of the second inner shape correction jig 32*a* described above and the shape 32*p*' similar to the outer circumferential shape of the cross section of the first inner shape correction jig composed of the second inner correction jigs 32*b* and 32*c* are preferably within the region R having an area ratio of 0.5 times or more and 0.9 times or less a shape that is the outer circumferential shape of the first inner correction jig and also is the inner circumferential shape of the wound magnetic core after the first heat treatment. It is preferred that the shape 32*p* and the shape 32*p*' more preferably have an area ratio of 0.8 times or more and 0.9 times or less the outer circumferential shape of the first inner correction jig.

Where a plurality of second inner shape correction jigs are placed in the internal space of the wound magnetic core, if the second inner shape correction jigs are movable, even when the ribbon of the wound magnetic core shrinks during nanocrystallization, it is possible to suppress the application of unnecessary stress to the wound magnetic core and the deterioration of magnetic properties of the wound magnetic core. Thus, as shown in FIG. 14, for example, second inner shape correction jigs 32*d* may be movably placed in the internal space 12*i* of the wound magnetic core 12'.

Figure 8:
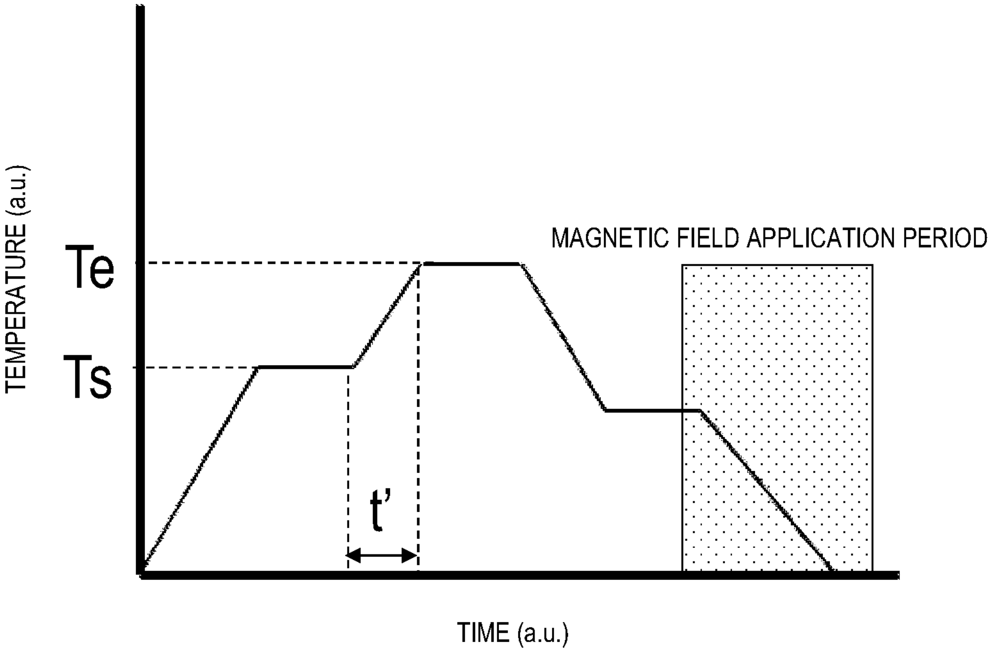
FIG. 8 is a graph illustrating a heat treatment condition of a second heat treatment step.

In the second heat treatment step, the wound magnetic core 12' is subjected to a nanocrystallization heat treatment. FIG. 8 shows an example temperature profile of the nanocrystallization heat treatment. The nanocrystallization heat treatment includes a period t' in which the temperature is increased from a temperature Ts lower than the crystallization start temperature to a temperature Te higher than the crystallization start temperature. The temperature increase can, be set in the range of 510° C. or higher and 600° C. or lower. If the heat treatment temperature is lower than 510° C. or higher than 600° C., magnetostriction is likely to increase. If the heat treatment temperature is 550° C. or higher and 600° C. or lower, it is possible to further reduce magnetostriction. Specifically, it is possible to reduce the saturation magnetostriction constant of the wound magnetic core to 3 ppm or less, further to 2 ppm or less, and further to 1 ppm or less.

In the nanocrystallization heat treatment, when the temperature is increased from a temperature lower than the crystallization start temperature to a temperature equal to or higher than the crystallization start temperature, the temperature increase rate at the crystallization start temperature is preferably a mild temperature increase rate of 0.2-1.2° C./min. This suppresses generation of coarse crystal grains due to self-heating of the ribbon that occurs during nanocrystallization, and allows for stable nanocrystallization. Note that up to 20° C. lower than the crystallization start temperature, the temperature may be increased relatively rapidly at a temperature increase rate of 3-5° C./min, for example. This can shorten the amount of time required for heat treatment and improve productivity.

The amount of time over which the temperature, is held at the maximum temperature during the nanocrystallization heat treatment needs to be sufficient for the growth of a nanocrystalline phase, preferably 10 minutes or more. More preferably, 15 minutes or more. While there is no particular limitation on the upper limit of the holding time during the nanocrystallization heat treatment, the amount of time being excessively long undesirably deteriorates the productivity. Therefore, the upper limit of the holding time during the nanocrystallization heat treatment is preferably 180 minutes, and more preferably 120 minutes. It is preferred that a magnetic field is not applied during the nanocrystallization heat treatment.

<Magnetic Field Application Step>

A magnetic field is applied to the wound magnetic core over a partial period of the second heat treatment step. For example, after sufficient growth of a nanocrystal phase, cooling is performed to a temperature that is lower than the maximum temperature, and a magnetic field is applied to give an induced magnetic anisotropy during the cooling. Specifically, the temperature may be held at a temperature during the cooling, and then a magnetic field may be applied while lowering the temperature. Here, the higher the holding temperature, the stronger the induced magnetic anisotropy is added and the lower the magnetic permeability becomes. In other words, it is possible to control the magnetic permeability by changing the holding temperature, before the application of a magnetic field. Note however that at a temperature below 200° C., an induced magnetic anisotropy cannot be added sufficiently, and at a temperature above 500° C., the crystal grain growth of a nanocrystalline phase is promoted, which increases the coercive force and deteriorates the soft magnetic properties. Therefore, the holding temperature before the application of a magnetic field is preferably 200° C. or higher and 500° C. or lower.

The temperature holding time before the application of a magnetic field is preferably 5 minutes or more, and more preferably 10 minutes or more. While there is no particular limitation on the upper limit of the holding time, if it is 10 hours or less, it is possible to shorten the amount of time needed for the heat treatment and it is possible to improve the productivity.

The direction in which a magnetic field is applied may be orthogonal to the magnetic path of the wound magnetic core. Thereafter, the temperature can be lowered while a magnetic field is applied.

The applied magnetic field strength is desirably 60 kA/m or more, and more desirably 100 kA/m or more. While there is no particular limitation on the upper limit of the magnetic field, it is preferably 400 kA/m or less because the induced magnetic anisotropy will not further be given even if it is over 400 kA/m.

When lowering the temperature while a magnetic field is applied, it is necessary to continue to apply a magnetic field until the temperature lowers to a sufficiently low temperature. A magnetic field is continuously applied until the temperature lowers preferably to 200° C. or lower, and more preferably to 100° C. or lower. A magnetic field may be applied by any of a direct-current magnetic field, an alternating-current magnetic field and a pulsed magnetic field.

The first heat treatment step and the second heat treatment step are preferably performed in a non-reactive atmosphere gas. When a heat treatment is performed in a nitrogen gas, a sufficient magnetic permeability is obtained, and a nitrogen gas can be treated substantially as a non-reactive gas. An inert gas may be used as a non-reactive gas. A reducing atmosphere produced by a hydrogen gas may be used. A heat treatment may be performed in a vacuum. Specifically, the first heat treatment step and the second heat treatment step are preferably performed in an atmosphere whose oxygen concentration is 10 ppm or less.

<Wound Magnetic Core of Nanocrystalline Soft Magnetic Alloy Ribbon>

A wound magnetic core according to the first embodiment of the present disclosure has a structure in which a nanocrystalline soft magnetic alloy ribbon is wound. As described above, the non-circular wound magnetic core of the present disclosure has a non-circular ring shape, and the outer edge and the inner edge thereof have non-circular shapes that are generally similar to each other. The wound magnetic core of the present disclosure can have excellent impedance characteristics, with an impedance relative magnetic permeability μrz of 45,000 or higher at 100 kHz. The wound magnetic core of the present disclosure can also have a high impedance relative magnetic permeability μrz over a wide frequency range, such as 80,000 or higher at 10 kHz and 10,000 or higher at 1 MHz.

It is believed that a non-circular wound magnetic core of a nanocrystalline soft magnetic alloy ribbon according to the present disclosure has a high impedance relative magnetic permeability μrz as described above for the following reason. An unintended induced magnetic anisotropy generated inside the amorphous ribbon can be reduced by reducing the stress caused by the inner shape correction jig during the heat treatment that involves crystallization, and therefore a uniform induced magnetic anisotropy is realized even for a non-circular shape. It is assumed that as the induced magnetic anisotropy is uniform, the magnetic wall movement component during the magnetization process is small, and the magnetic moment can follow at a high frequency.

The magnetic core having a high impedance relative magnetic permeability μrz described above is useful as a magnetic core for a common mode choke core, and functions as a common mode choke by winding a conductive wire therearound or passing a conductive wire therethrough, for example.

The impedance relative magnetic permeability μrz is often used as a characteristic index as a common mode choke. The impedance relative magnetic permeability μrz is described in JIS standard C2531 (revised in 1999), for example. The impedance relative magnetic permeability μrz can be considered to be equal to the absolute value of the complex relative magnetic permeability (μr'−iμr"), as shown in Expression (1) below (see, for example, "Key Points in Selecting Magnetic Materials", published Nov. 10, 1989, Editor: Keizo Ota).

$$\mu rz=(\mu r'^2+\mu r''^2)^{1/2} \quad (1)$$

The real part pr' of the complex relative magnetic permeability in Expression (1) above represents the magnetic flux density component with no phase lag relative to the magnetic field, and generally corresponds to the magnitude of the impedance relative magnetic permeability μrz in the low frequency range. On the other hand, the imaginary part μr" represents the magnetic flux density component with phase lag relative to the magnetic field, and corresponds to the loss of magnetic energy. The impedance, of the wound magnetic core is proportional to the impedance relative magnetic permeability μrz, and if the impedance relative magnetic permeability μrz is high over a wide frequency range, a high impedance is obtained, meaning it has excellent common mode noise reduction capability.

In a state where an AC magnetic field of frequency f=10 kHz and amplitude H=0.05 A/m is applied, a wound magnetic core of the present disclosure may have a relative magnetic permeability μ (10 kHz) of 80,000 or more, as measured at room temperature, a direct-current BH loop squareness ratio Br/Bm of 50% or less and a coercive force of 1.1 A/m or less.

The wound magnetic core of the present disclosure may be impregnated with a resin. Since a wound magnetic core using a nanocrystal becomes brittle during heat treatment for nanocrystallization, the wound magnetic core may be impregnated with a resin to improve the mechanical stability. It may also be impregnated with a resin to maintain the non-circular shape. When impregnated with a resin, stress is applied to the nanocrystalline alloy ribbon, thereby changing the impedance of the wound magnetic core and making it not suitable for customer requirements, which is a problem in characteristic design.

With the nanocrystalline alloy magnetic core of the present disclosure, the change in impedance characteristics can be minimized even when impregnated with a resin. As the resin for impregnation, an epoxy resin, an acrylic resin, and the like, can be used as appropriate. The volume of the resin solvent used for impregnation of these resins is generally about 5 wt %-40 wt % relative to the weight of the resin. In the case of resin impregnation, after the second heat treatment step, the nanocrystalline alloy magnetic core is immersed in a container filled with a solution in which a resin as described above, is dissolved, the nanocrystalline alloy magnetic core is pulled up from the container, and the solvent is dried to obtain an alloy core including the nanocrystalline alloy magnetic core and the resin with which the magnetic core is impregnated.

<Magnetic Permeability>

The term "magnetic permeability" as used in the present application is synonymous with "relative magnetic permeability". The relative magnetic permeability measured at room temperature while an AC magnetic field of frequency f=1 kHz and amplitude H=0.05 ampere/meter (A/m) is applied is denoted as μr (1 kHz).

The impedance relative magnetic permeability is denoted as μrz. Note that the impedance relative magnetic permeability was measured by an impedance/gain-phase analyzer (Model No. 4194A) manufactured by Keysight. The measurement was performed with an insulated conductive wire passed through the center of the wound magnetic core and connected to the input/output terminal.

Example 1

A molten alloy consisting of Cu: 1%, Nb: 3%, Si: 15.5%, B: 6.5%, the remainder Fe and unavoidable impurities in atom % was quenched by a single-roll method to obtain an Fe-based amorphous alloy ribbon having a width of 50 mm and a thickness of 14 μm. This Fe-based amorphous alloy ribbon was slit (severed) to a width of 35 mm.

The slit Fe-based amorphous alloy ribbon was wound into a circular shape with an outer diameter of 90 mm and an inner diameter of 80 mm (height: 35 mm) to obtain a wound magnetic core. The crystallization start temperature of the alloy was 529° C. as measured by a differential scanning calorimeter (DSC).

Then, the circularly wound magnetic core was deformed into a generally triangular non-circular shape by arranging the first inner shape correction jig 31 on the inner circumference side and the outer shape correction jigs 2*a* and 2*b* on the outer circumference side as shown in FIG. 2. SUS304, a non-magnetic metal, was used for the first inner shape correction jig 31 and the outer shape correction jigs 2*a* and 2*b*.

Figure 9:
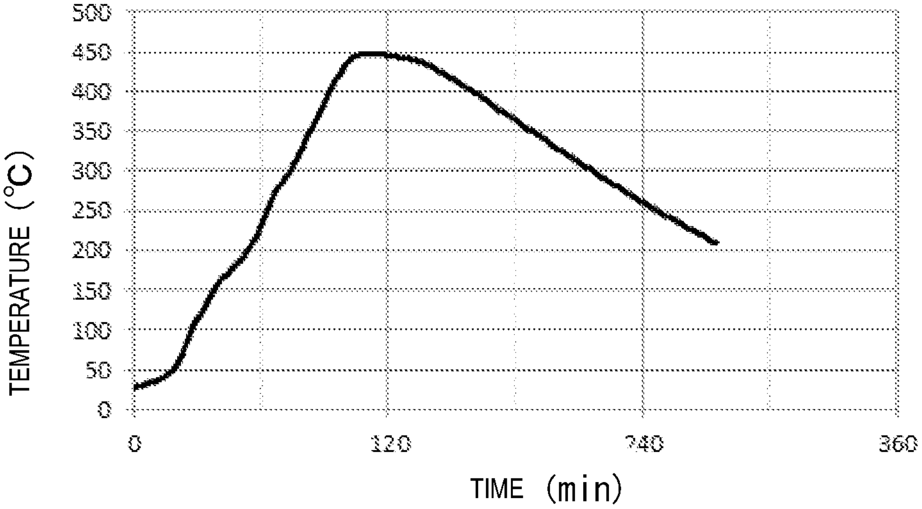
FIG. 9 is a graph showing a heat treatment condition of a first heat treatment step in Example 1.

Then, a wound magnetic core straightened into a non-circular shape was subjected to heat treatment with the temperature profile shown in FIG. 9. Note that the temperature shown here is the temperature of the atmosphere in the heat treatment furnace controlled by a temperature controller (KP1000C manufactured by Chino). The first heat treatment was performed in a nitrogen atmosphere with an oxygen concentration of 10 ppm or less (2 ppm).

The temperature controller for the first heat treatment was programmed to increase the temperature of the wound magnetic core from room temperature to 450° C. in 90 minutes (a temperature increase rate of 4.8° C./min), hold it for 30 minutes, and then decrease, the temperature to 100° C. or lower over 220 minutes (a temperature decrease rate of 1.6° C./min).

Then, the second heat treatment step was performed.

First, the first inner shape correction jig was removed. Since the wound magnetic core made of an amorphous alloy ribbon is given a winding curl through the first heat treatment, the shape of the wound magnetic core is maintained even after the first inner shape correction jig is removed. Then, as shown in FIG. 4, the second inner shape correction jig, smaller than the first inner shape correction jig, was placed in the internal space of the wound magnetic core. The external dimension of the second inner shape correction jig was smaller by 1% than the first inner shape correction jig as viewed in the axial direction. Therefore, there was a gap between the inner circumference side of the wound magnetic core made of an amorphous alloy ribbon and the second inner correction jig. The outer correction jig was not removed, and the outer correction jig was left in place.

Figure 10:
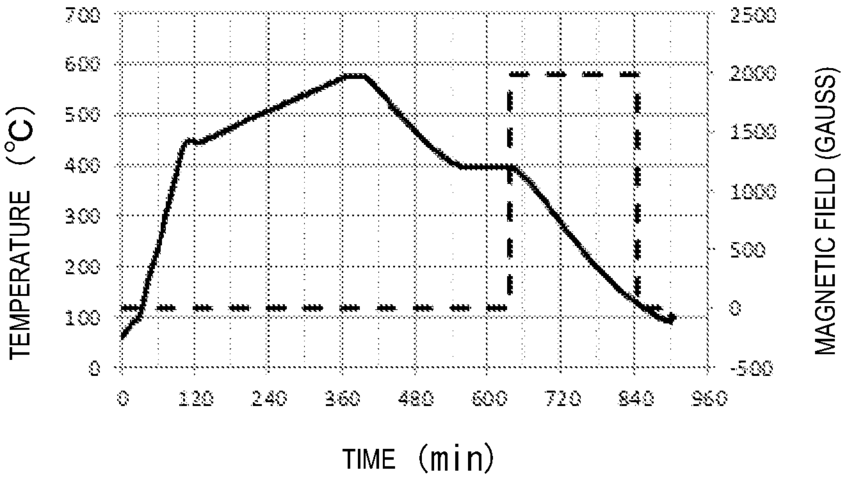
FIG. 10 is a graph showing a heat treatment condition of a second heat treatment step in Example 1.

Then, the heat treatment was performed with the temperature profile shown in FIG. 10. The temperature controller was programmed to first increase the temperature from room temperature to 450° C. in 90 minutes (a temperature increase rate of 4.8° C./min) and held for 30 minutes. Thus, the temperature distribution inside the wound magnetic core was uniform at 450° C. Then, the temperature was increased to 580° C. in 240 minutes (a temperature, increase rate of 0.5° C./min). During this temperature increase, nanocrystallization started at around 529° C., and the volume of the wound magnetic core shrank by about 1%. Since a gap was provided between the wound magnetic core and the second inner shape correction jig, the obtained wound magnetic core was not subjected to stress due to shrinkage. Since the temperature is increased at a low rate of 0.5° C./min, the formation of a coarse crystal grain system due to self-heating that occurs when the ribbon is nanocrystallized can be suppressed, realizing stable nanocrystallization. Then, the temperature was held at 580° C. for 30 minutes and decreased to 400° C. over 160 minutes (a temperature decrease rate of 1.1° C./mim). Then, by holding at 400° C. for 80 minutes, the temperature distribution inside the wound magnetic core was made uniform at 400° C. This heat treatment was performed in a nitrogen atmosphere with an oxygen concentration of 10 ppm or less (2 ppm).

After holding at 400° C., the temperature was decreased (a temperature decrease rate of 1.4° C./mim) while applying a magnetic field. The magnetic field was applied in a direction orthogonal to the magnetic path direction in the wound magnetic core (the axial direction of the wound magnetic core in the present embodiment). The applied magnetic field strength was 160 kA/m. A magnetic field is applied until the temperature is decreased to 100° C. or lower, thereby giving an induced magnetic anisotropy. Then, the second inner shape correction jig and the outer shape correction jig were removed. Thus, a wound magnetic core having a non-circular shape of the present example was obtained. The wound magnetic core had a relative magnetic permeability μr'(10 kHz) of 86,000. The magnetostriction was 1 ppm or less.

Figure 11:
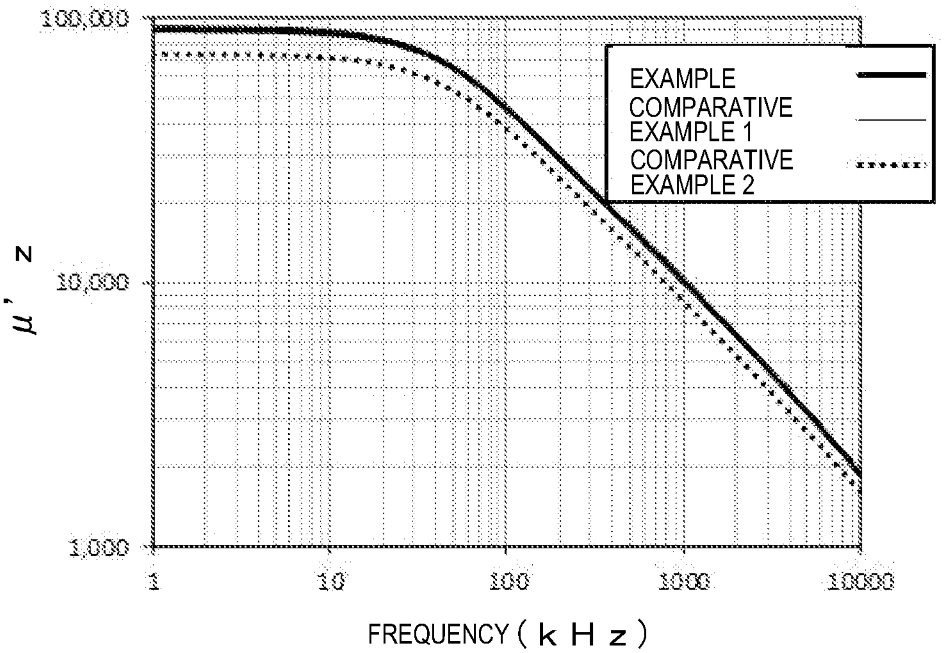
FIG. 11 is a graph showing frequency characteristics of the impedance relative magnetic permeability.
Figure 12:
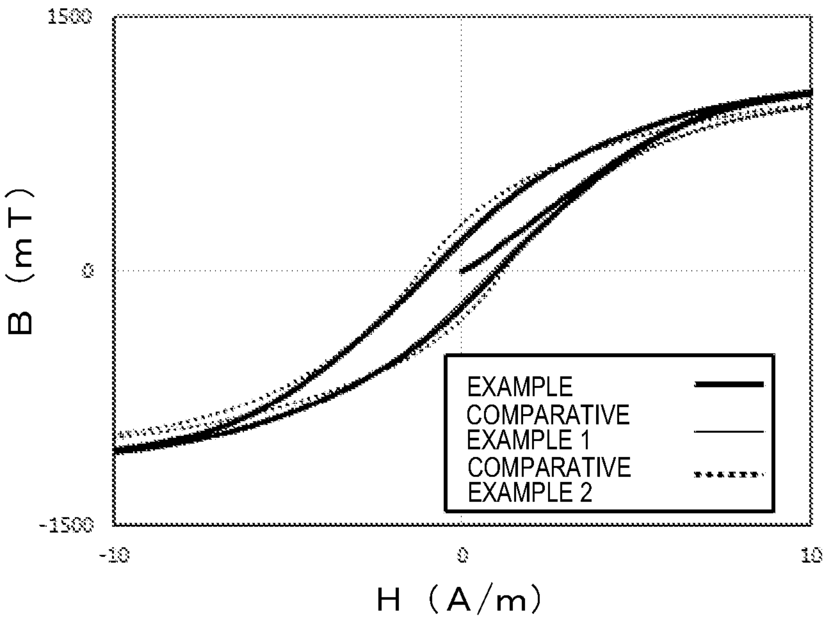
FIG. 12 is a graph showing direct-current B—H characteristics.

FIG. 11 is a graph showing frequency characteristics of the impedance relative magnetic permeability μrz of the wound magnetic core obtained in the present example. The impedance relative magnetic permeability μrz at 100 kHz (100 kHz) was 45,000 or more (45,441). FIG. 12 is a graph showing the direct-current B—H curve of the wound magnetic core obtained in the present example. The coercive force was 1 A/m or less (0.95 A/m).

Table 1 shows measured values of the impedance relative magnetic permeability μrz, and Table 2 shows, as other characteristics, the saturation magnetic flux density Bm, the residual magnetic flux density Br and the squareness ratio Br/Bm of the direct-current BH loop.

TABLE 1

| | Impedance relative magnetic permeability μrz | | |
|---|---|---|---|
| f (kHz) | Example 1 | Comparative Example 1 | Comparative Example 2 |
| 1 | 90035 | 93569 | 72852 |
| 10 | 87583 | 89952 | 70221 |
| 100 | 45441 | 45680 | 37808 |
| 1000 | 10119 | 10213 | 8470 |
| 10000 | 1865 | 1867 | 1607 |

TABLE 2

| | Coercive force Hc (A/m) | Saturation magnetic flux density Bm (mT) | Residual magnetic flux density Br (mT) | Squareness ratio Br/Bm ( %) |
|---|---|---|---|---|
| Example 1 | 0.95 | 1167.5 | 194.4 | 16.7 |
| Comparative Example 1 | 0.82 | 1142.6 | 163.7 | 14.3 |
| Comparative Example 2 | 1.17 | 1141.0 | 273.3 | 24.0 |

Comparative Example 1

A circular wound magnetic core was produced as Comparative Example 1. An amorphous alloy ribbon was wound into a circular shape to obtain a wound magnetic core, which, as it is in a circular shape, was subjected to a nanocrystallization heat treatment without the outer shape correction jig and the inner shape correction jig, thereby obtaining a wound magnetic core. The conditions of the heat treatment were the same as those of the nanocrystallization heat treatment of the second heat treatment step of Example 1.

FIG. 11, FIG. 12, Table 1 and Table 2 also show characteristics of a wound magnetic core obtained in Comparative Example 1. The frequency characteristics and the B—H curve are substantially the same between Example 1 and Comparative Example 1, and the curves coincide with those shown in the graphs of Example 1 in FIG. 11 and FIG. 12. It can be seen that the non-circular wound magnetic core of Example 1 of the present embodiment realizes characteristics equivalent to those of a circular core.

Comparative Example 2

As Comparative Example 2, a wound magnetic core was produced by performing a nanocrystallization heat treatment in the second heat treatment step without removing the first inner shape correction jig, i.e., with the first inner shape correction jig left in place. Otherwise, the manufacturing conditions were set to be equal to those of Example 1.

FIG. 11, FIG. 12, Table 1 and Table 2 also show characteristics of a magnetic core obtained in Comparative Example 2. The coercive force of the wound magnetic core of Comparative Example 2 is 1.17 A/m, exhibiting a greater value than Example 1. The impedance relative magnetic permeability μrz at 100 kHz (100 kHz) of the wound magnetic core of Comparative Example 2 is only 37,808, which is lower than Example 1. Over a wide frequency range of 1 kHz-10 MHz, the wound magnetic core of Comparative Example 2 shows a lower impedance relative magnetic permeability μrz than Example 1. This indicates that by using the method shown in Example 1, it is possible to obtain a non-circular wound magnetic core having a higher impedance relative magnetic permeability μrz than Comparative Example 2.

REFERENCE SIGNS LIST

11: Circular wound magnetic core
12: Non-circular wound magnetic core
2*a*, 2*b*: Outer shape correction jig
31: First inner shape correction jig
32*a*, 32*b*, 32*c*: Second inner shape correction jig

What is claimed is:

1. A wound magnetic core of a nanocrystalline soft magnetic alloy ribbon, wherein the wound magnetic core has a non-circular shape, and an impedance relative magnetic permeability μrz at 100 kHz of the wound magnetic core is 45000 or more; and wherein the wound magnetic core has no portion where the nanocrystalline soft magnetic alloy ribbon is spaced apart by 0.1t or more from a nanocrystalline soft magnetic alloy ribbon that is adjacent thereto in a stacking direction, wherein t is a thickness of the wound magnetic core in the stacking direction, and wherein the nanocrystalline soft magnetic alloy ribbon has a composition represented by $(Fe_{1-a}M_a)_{100-x-y-z-\alpha-\beta-\gamma}Cu_xSi_yB_zM'_\alpha M''_\beta X_\gamma$ (atom %), where M is at least one element selected from Co and Ni, M' is at least one element selected from Nb, Mo, Ta, Ti, Zr, Hf, V, Cr, Mn and W, M" is at least one element selected from Al, platinum group elements, Sc, rare earth elements, Zn, Sn and Re, and X is at least one element selected from C, Ge, P, Ga, Sb, In, Be and As, a, x, y, z, α, β and γ, which define the composition ratio, can satisfy the following relationships;

$0 \le a < 0.5$,
$0.1 \le x \le 3$,
$10 \le y \le 20$,
$5 \le z \le 10$,
$0.1 \le \alpha \le 5$,
$0 \le \beta \le 10$, and
$0 \le \gamma \le 10$.

2. The wound magnetic core of a nanocrystalline soft magnetic alloy ribbon according to claim 1, wherein the wound magnetic core has a racetrack shape or has a racetrack shape with a concave/convex portion along at least one straight portion of the racetrack shape.

3. The wound magnetic core of a nanocrystalline soft magnetic alloy ribbon according to claim 1, wherein in a state where an AC magnetic field of frequency f=10 kHz and amplitude H=0.05 A/m is applied, the wound magnetic core has a relative magnetic permeability μ (10 kHz) of 80,000 or more, as measured at room temperature, a direct-current BH loop squareness ratio Br/Bm of 50% or less and a coercive force of 1.1 A/m or less.

4. An alloy core comprising:

the wound magnetic core of a nanocrystalline soft magnetic alloy ribbon according to claim 1; and a resin with which the wound magnetic core is impregnated.

* * * * *